United States Patent
Baker et al.

(10) Patent No.: US 6,266,331 B1
(45) Date of Patent: Jul. 24, 2001

(54) DEVICE FOR GENERATING MULTIPLE SPREADING SEQUENCES IN REVERSE HIGH SPEED DATA CHANNELS

(75) Inventors: Thomas W. Baker, Orefield, PA (US); Richard A. Cesari, Dallas, TX (US); Xiao-An Wang, Allentown, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/108,429

(22) Filed: Jul. 1, 1998

(51) Int. Cl.[7] .............................. H04B 7/216; G06F 7/58

(52) U.S. Cl. ..................... 370/335; 370/342; 370/441; 370/479; 708/250

(58) Field of Search ............................. 708/250; 380/46, 380/268; 375/130, 367; 370/209, 335, 342, 441, 479, 515

(56) References Cited

U.S. PATENT DOCUMENTS

| | | | |
|---|---|---|---|
| 5,434,807 | * | 7/1995 | Yoshida ............................... 708/250 |
| 5,438,622 | * | 8/1995 | Normile et al. ...................... 380/46 |
| 5,444,648 | * | 8/1995 | Yoshida et al. ...................... 708/250 |
| 5,559,829 | | 9/1996 | Le Strat et al. . |
| 5,574,673 | * | 11/1996 | Lowy ................................... 708/250 |
| 5,631,922 | | 5/1997 | Sekine et al. . |
| 5,835,488 | * | 11/1998 | Sugita ................................. 370/335 |

OTHER PUBLICATIONS

"Mobile Station—Base Station Compatibility Standard for Dual–Mode Wideband Spread Spectrum Cellular System", TIA/EIA/IS–95A, Jul. 1995.

* cited by examiner

Primary Examiner—Ricky Ngo
(74) Attorney, Agent, or Firm—Synnestvedt & Lechner LLP

(57) ABSTRACT

The present invention discloses a device for generating multiple spreading sequences efficiently.

In a preferred embodiment, the eight different spreading sequences are generated in parallel. In this embodiment, the spreading sequence generator comprises a master sequence generator and eight secondary sequence generators. The spreading sequence generator also comprises eight different modulo-2 adders which are used for generating parity check sum outputs.

The master sequence generator is responsible for creating a master output from the first subgroup. The secondary sequence generators create eight different secondary outputs. Each of the secondary outputs is combined with the master output through one of the eight modulo-2 adders to create eight different spreading sequences.

In an alternative embodiment, the principles of the present invention may be used to generate such spreading sequences in a sequential manner. Both embodiments provide efficiency and power savings over the prior art method and apparatus.

50 Claims, 5 Drawing Sheets

DEVICE FOR GENERATING MULTIPLE SPREADING SEQUENCES IN REVERSE HIGH SPEED DATA CHANNELS

FIELD OF THE INVENTION

The present invention generally relates to high speed data transmission in a Code Division Multiple Access (CDMA) system. In particular, the invention relates to the generation of multiple spreading sequences applicable to the reverse channels of a mobile radio terminal device (hereinafter "mobile station") which is effectively used in a mobile communication system employing CDMA operations such as a personal communication system (PCS), a digital cellular telephone, or the like.

BACKGROUND OF THE INVENTION

There are three major types of multiple access digital transmission systems, known as Frequency Division Multiple Access (FDMA), Time Division Multiple Access (TDMA), and Code Division Multiple Access (CDMA). FDMA entails spreading the calls to be transmitted by assigning each call a specific frequency band which can be separated from the others by filtering at the receiving end. TDMA entails sending the multiple calls using the time sharing of the entire band of the transmission channel. That is to prevent information overlapping, only one station transmits data at a time and, when it does, it occupies all of the channel band width.

FDMA and TDMA are rarely used today because of their inherent problems. FDMA requires a receiver for each transmission channel, so that a considerable number of receivers are required in a central base station if it is to be possible to converse simultaneously with a large number of mobile stations. TDMA systems encounter difficult problems with equalization if the transmission channel is disrupted by echoes or by jamming.

CDMA uses spread spectrum techniques and is a preferred multiple access digital transmission system. In a CDMA communication system, a call between a base station and a mobile station is established by employing code channels. In other words, the mobile station selects an optimum base station for communication and the base station assigns to the mobile station code channels to be used for communication.

In CDMA, a digital data signal is multiplied by a spreading sequence before it is transmitted. A different spreading sequence is associated with each mobile station (i.e., each user) connected to a base station. A spreading sequence is usually in the form of a pseudo-random binary sequence characterized by its chip frequency, and by a repetition period of the pseudo-random sequence called the code period.

A digital data signal to be transmitted is in the form of a binary signal characterized by its bit frequency. The bit frequency is a multiple of the chip frequency, and the spreading factor of a spreading sequence is the ratio between the chip frequency and the bit frequency.

The digital data signal to be transmitted is combined with the spreading sequence, for example by modulo addition or by multiplication, depending upon the nature of the signals. The resulting signal is filtered and then transmitted over a code channel. The code channel is distinguished at the base station in accordance with the distinctions of the spreading sequences for the mobile station. The number of spreading sequences for a mobile station corresponds to the number of code channels.

At the receiving end, after further filtering, decoding is effected by combining the received signal with a local replica of the spreading sequence synchronized to the transmission. It results in the retrieval of the original digital data signal.

A CDMA communication method, one of the spread spectrum communication methods, has been disclosed, for example, in "Mobile Station—Base Station Compatibility Standard for Dual-Mode Wideband Spread Spectrum Cellular System" TIA/EIA/IS-95A, Jul. 1995 as a TIA/EIA standard. This IS-95A standard has been modified to incorporate the high speed data capacity that requires simultaneous transmission of up to eight code channels. Consequently, the transmission of high speed data requires simultaneous generation of eight spreading sequences to be incorporated within the eight code channels.

FIG. 1 is a block diagram of a prior art spreading sequence generator 100 used to generate multiple spreading sequences. The spreading sequence generator 100 comprises a long code generator 102, a mask register 104, an AND operator 110, and a modulo-2 adder 114.

The long code generator 102 generates a long code 108, and the mask register 104 generates a masking stream 106. In a typical embodiment, the long code 108 comprises forty two states and the masking stream 106 comprises forty two mask bits. The long code 108 and masking stream 106 are combined by an AND operator 110 and the product is then fed to the modulo-2 adder 114. The resulting output 116 is a spreading sequence to be used for various mobile stations transmitting high speed data.

In the prior art, to generate eight different spreading sequences, the above process is repeated eight different times by loading the mask register with eight different masks during one chip interval. The output sequentially produces eight different spreading sequences, one for each code channel.

This sequential approach of generating eight different spreading sequences is very expensive and time consuming as it requires eight separate operations. Moreover, extra circuitry is required to handle the loading of the masks and the multiplexing of the output.

Therefore, there exists a need for a device which may generate multiple spreading sequences in parallel with reduced power and time requirements.

SUMMARY OF THE INVENTION

The present invention discloses a device for generating multiple spreading sequences efficiently. The preferred embodiment according to the principles of the invention is a spreading sequence generator which generates eight different spreading sequences in parallel.

The present invention uses the presently known forty two bit long code and forty two bit masking stream mechanism. In the preferred embodiment, there exists eight code channels differentiated by a three bit code channel index number. The long code states and mask bits comprise two subgroups. The first subgroup comprises thirty nine states and thirty nine masking bits which are common for all eight channels used in the high speed transmission. The second subgroup comprises three states and three masking bits. These three mask bits and states are unique for each code channel.

The thirty nine states and thirty nine bits belonging to the first subgroup are logically combined to generate a parity check sum output. The output from this group is termed the master output.

The three states and three masking bits belonging to the second subgroup are used to generate eight different secondary outputs, one for each code channel. First, the masking bits belonging to the second subgroup are logically combined with the corresponding code channel index number to generate eight different masks. The masks and states are then combined to generate the secondary outputs. Each of the eight masks is then combined with the corresponding states in the second group, thereby creating eight different secondary outputs.

These three bit wide secondary outputs from the second subgroup are combined with the master output from the first group through a modulo-2 adder. The output of the modulo-2 adder is the spreading sequence for the corresponding code channel. In total, eight spreading sequences are generated, one for each code channel.

In the preferred embodiment, the spreading sequence generator comprises a master sequence generator and eight secondary sequence generators. The spreading sequence generator also comprises eight different modulo-2 adders which are used for generating parity check sum outputs.

The master sequence generator is responsible for creating a master output from the first subgroup. The secondary sequence generators create eight different secondary outputs. Each of the secondary outputs is combined with the master output through one of the eight modulo-2 adders to create eight different spreading sequences. In a preferred embodiment, the eight different spreading sequences are generated in parallel. In an alternative embodiment, the principles of the present invention may be used to generate such spreading sequences in a sequential manner. Both embodiments provide efficiency and power savings over the prior art method and apparatus.

DETAILED DESCRIPTION OF A PREFERRED EMBODIMENT OF THE INVENTION

The present invention provides a spreading sequence generator to generate multiple spreading sequences simultaneously.

Figure 1:
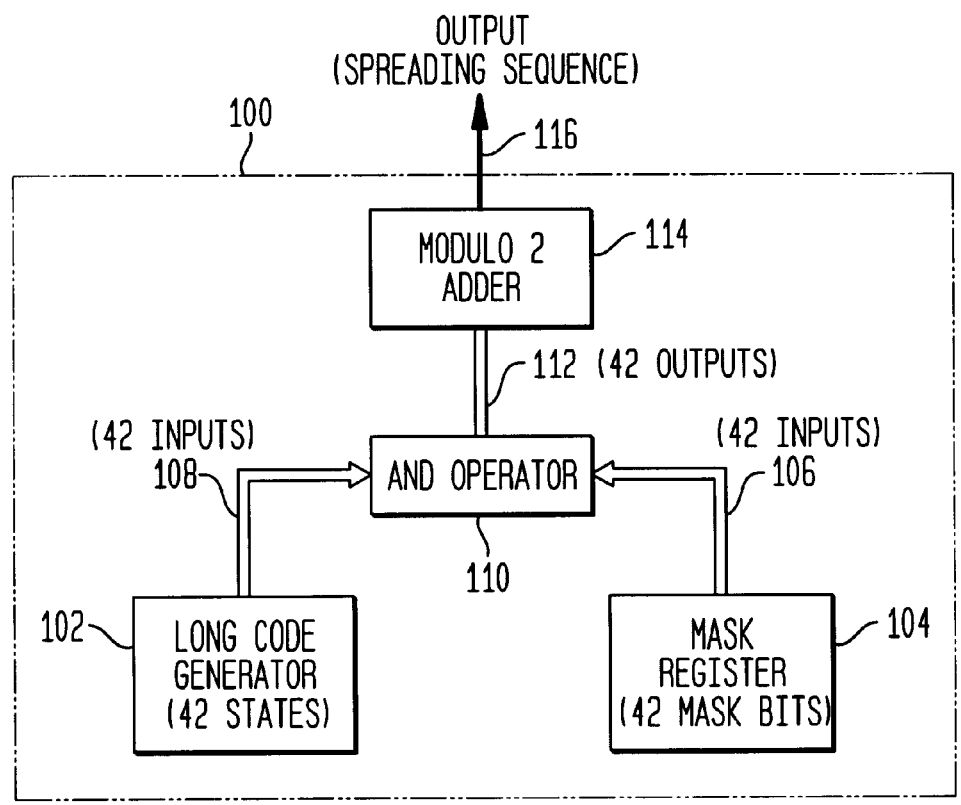
FIG. 1 is a block diagram of a prior art spreading sequence generator and its functionality.
Figure 2:
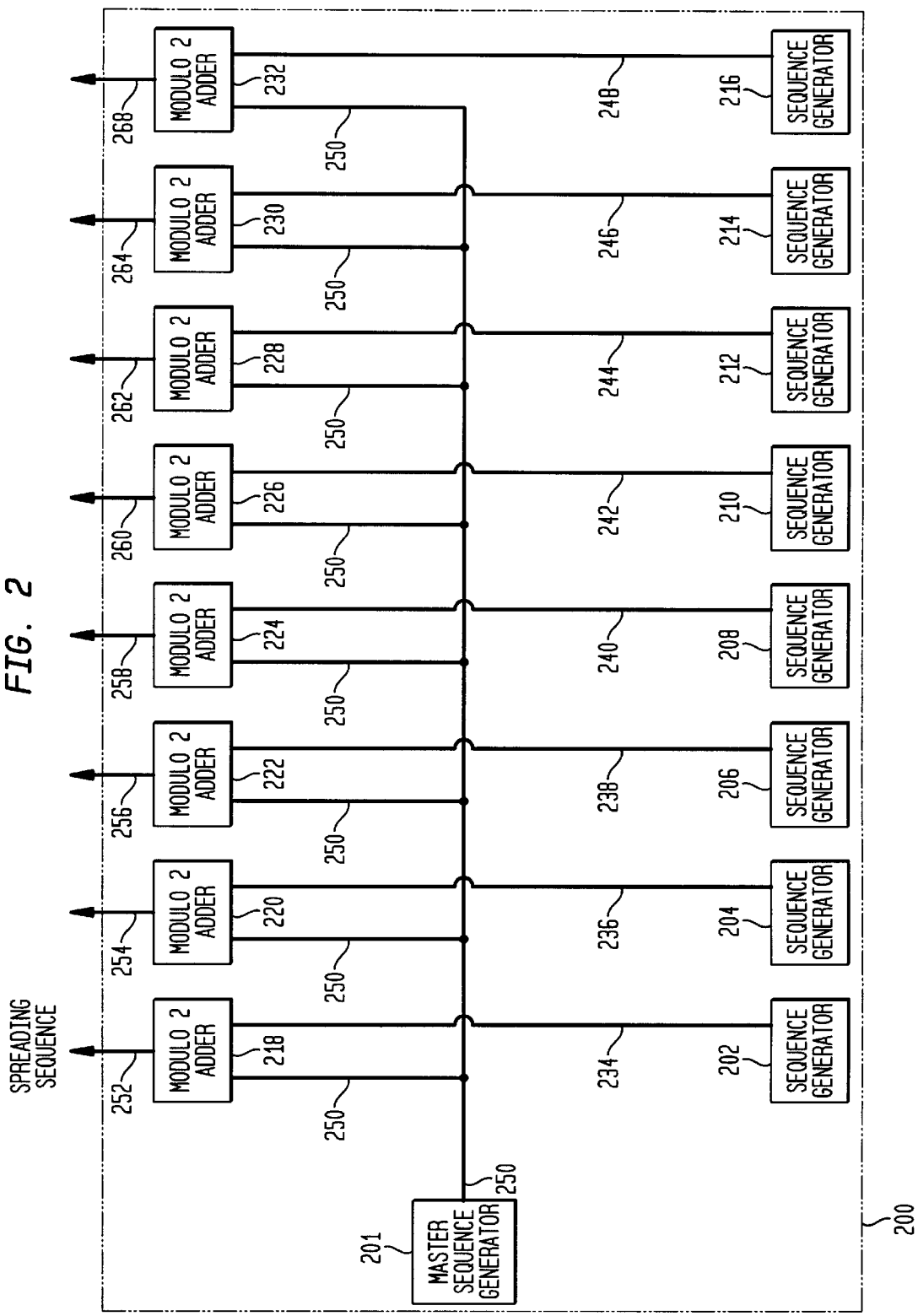
FIG. 2 is a block diagram of a spreading sequence generator in accordance with a preferred embodiment of the present invention.

FIG. 2 is a block diagram illustrating a preferred embodiment of the device generating multiple spreading sequences according to the present invention, in which a spreading sequence generator 200 generates eight different spreading sequences in parallel. The spreading sequence generator 200 comprises a master sequence generator 201 and eight secondary sequence generators 202, 204, 206, 208, 210, 212, 214, and 216.

The spreading sequence generator 200 also comprises eight different modulo-2 adders 218, 220, 222, 224, 226, 228, 230 and 232 which are used for generating parity check sum outputs.

The master sequence generator 201 is responsible for creating a master output 250. The secondary sequence generators 202–216 respectively generate secondary outputs 234, 236, 238, 240, 242, 244, 246 and 248. Each of the secondary outputs is combined with the master output 250 through one of the eight modulo-2 adders to create eight spreading sequences 252, 254, 256, 258, 260, 264, 268. For example, the secondary output 234 from the sequence generator 202 and the master output 250 is combined by modulo-2 adder 218. The output is the first spreading sequence 252.

The same operation is repeated simultaneously for secondary sequence generators 204, 206, 208, 210, 212, 214, 216 to generate spreading sequences 254, 256, 258, 260, 262, 264, 268.

Figure 3:
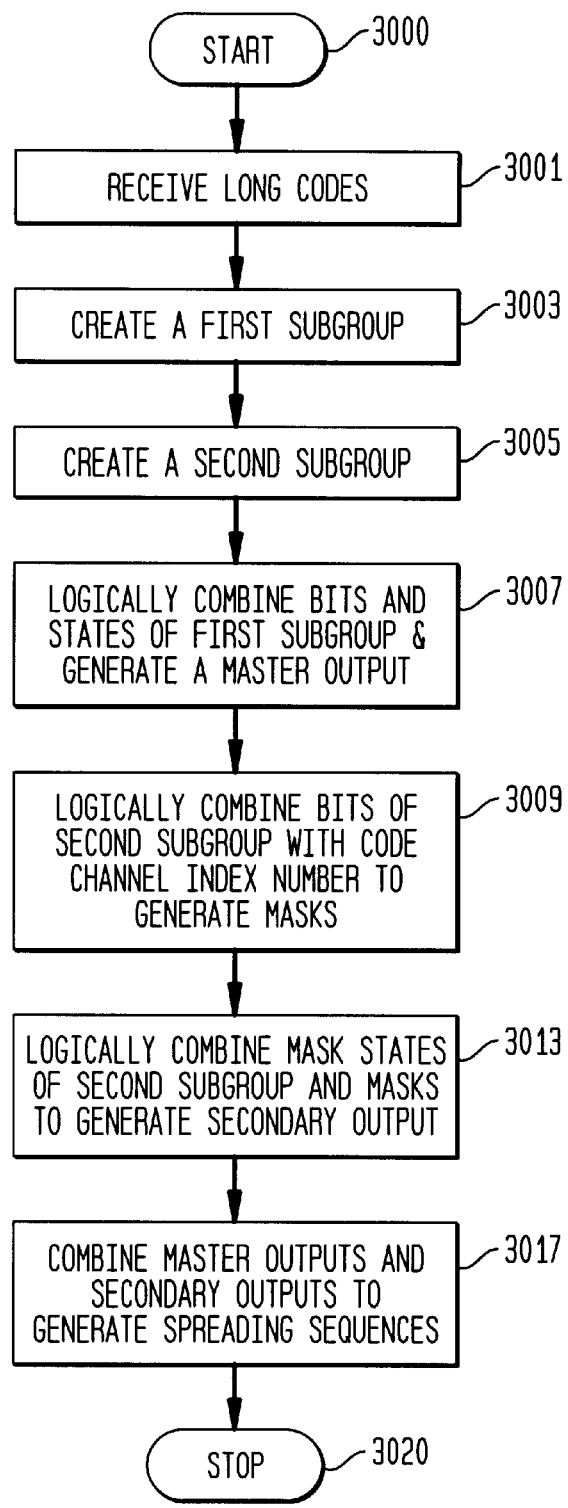
FIG. 3 is a process flowchart illustrating an operation of the spreading sequence generator shown in FIG. 2.

FIG. 3 is the process flowchart illustrating the operation of the spreading sequence generator 200.

The process starts with step 3000. In step 3001, eight long codes are received wherein each long code is associated with a code channel index number (0–7) and comprises 42 bits M0–M41 and 42 states S0–S41. In step 3003, a first subgroup is created. The first subgroup comprises thirty nine bits M0–M36, M40, M41 and thirty nine states S0–S36, S40, S41 which are identical for each long code.

In step 3005, a second subgroup is created. The second subgroup comprises three bits, M37, M38, M39, and three states, S37, S38, S39. These bits and states are known as mask bits and mask states, and they differ for each of the long codes.

In step 3007, the bits and states of the first subgroup are logically combined by master sequence generator 201 to generate the master output 250 (see FIG. 2).

Figure 5:
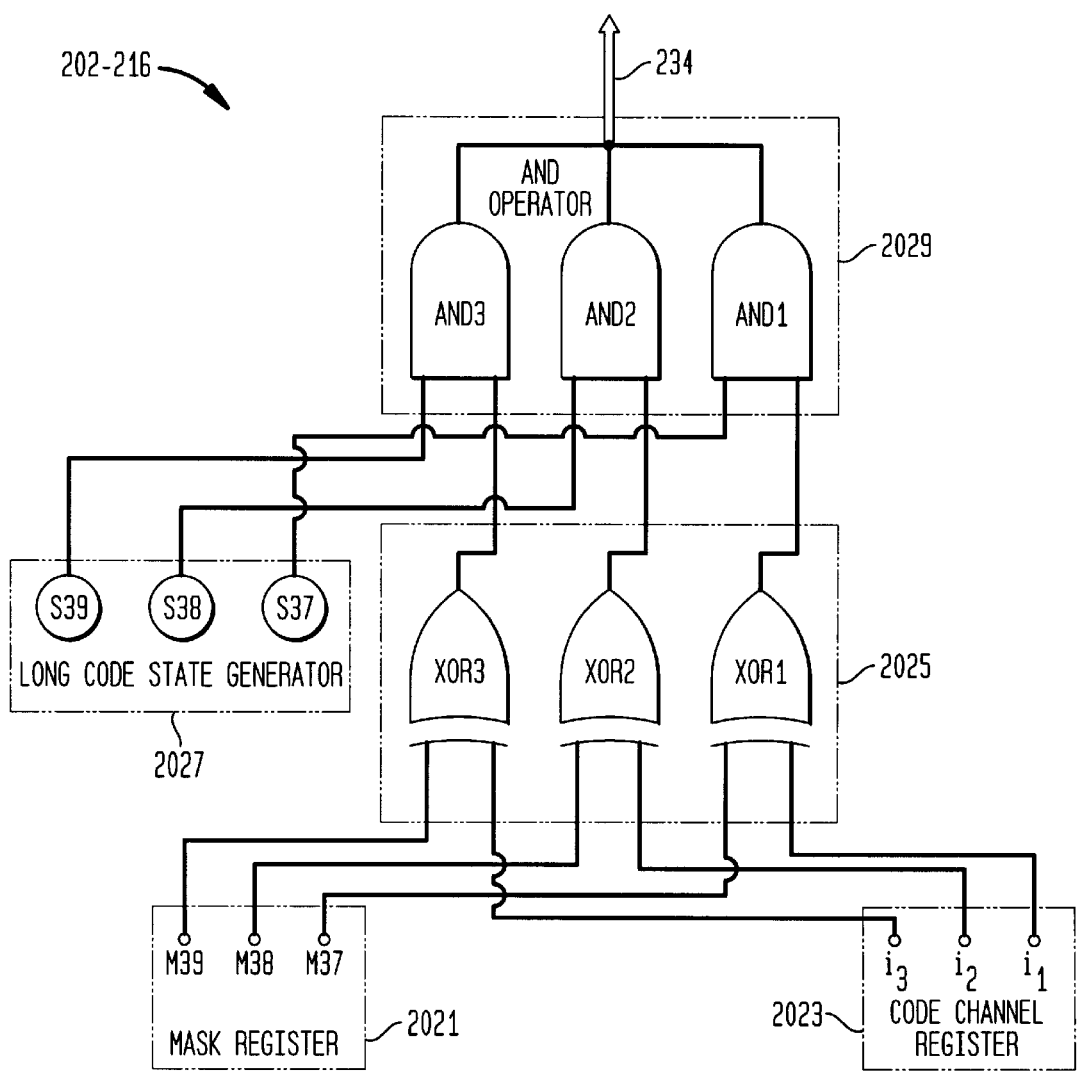
FIG. 5 is a block diagram of the secondary sequence generators 202–216 of FIG. 2 of the present invention.

In step 3009, the mask bits M37, M38, M39 of the second subgroup and corresponding code channel index number is logically combined by XOR operator 2025 to generate a mask (see FIG. 5). There are eight different code channel numbers, therefore, eight different masks are generated.

Next in step 3013, the mask states S37, S38, and S39 and the corresponding mask are logically combined by sequence generators 202–216 to generate secondary outputs (see FIG. 2). A total of are eight secondary outputs 234–248 are generated wherein each secondary output is associated with a corresponding code channel index number.

In step 3017, the master output 250 and the secondary outputs are logically combined to generate eight different spreading sequences 252–268 (see FIG. 2).

After eight spreading sequences have been generated, the process ends in step 3020.

In the preferred embodiment, the above process is run such that eight spreading sequences are generated in parallel. In an alternate embodiment, the process may be run to generate eight different spreading sequences in a sequential manner.

Figure 4:
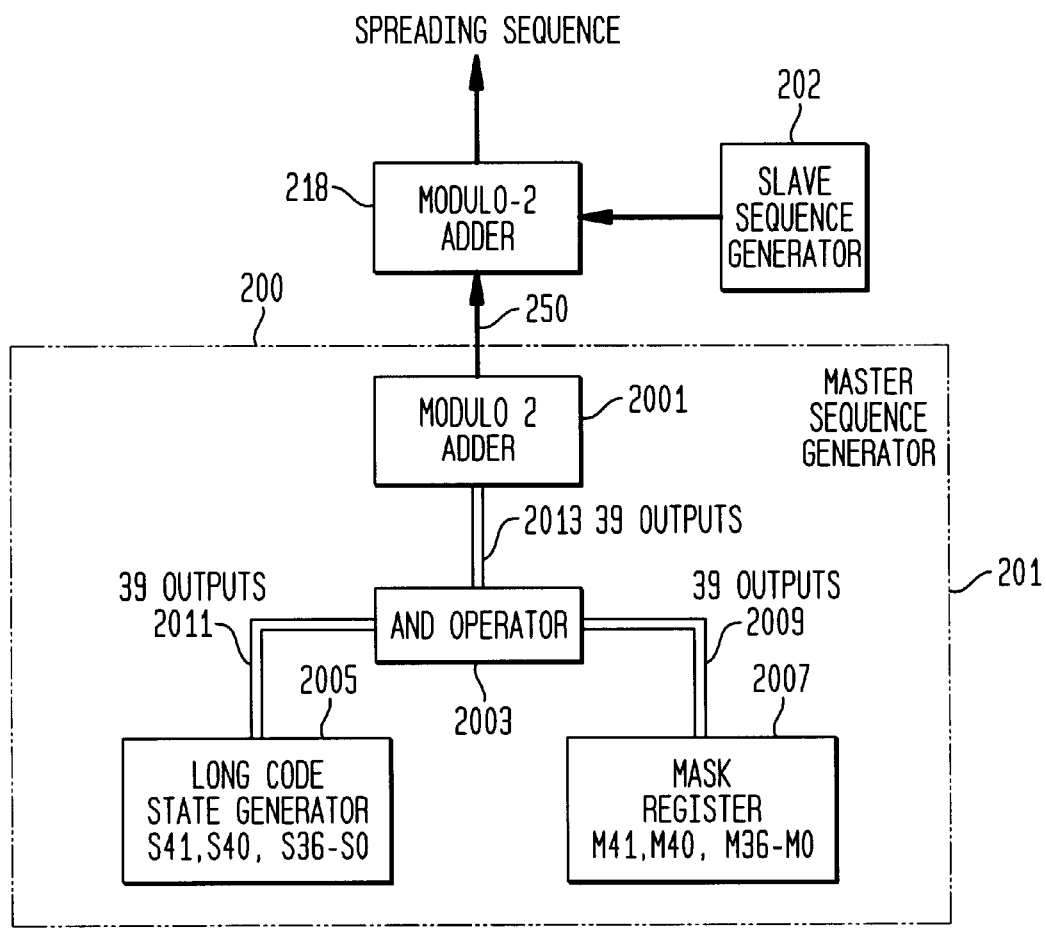
FIG. 4 is a block diagram of the master sequence generator 201 of FIG. 2 of the present invention.

FIG. 4 is a block diagram of the master sequence generator 201 of FIG. 2.

The master sequence generator 200 comprises a long state generator 2005, a mask register 2007, an AND operator 2003, and a modulo-2 adder 2001.

The long state generator 2005 generates an output 2011. The output 2011 comprises thirty nine states, S0–S36, S40, and S41. The mask register 2007 creates a corresponding output 2009. The output 2009 comprises thirty nine mask bits, M0–M36, M40, and M41. The output 2011 and output 2009 are logically combined by an AND operator 2003. The AND operator 2003 creates an output 2013. The output 2013 is then fed to module-2 adder 2001 for a parity check. The resulting output is the master output 250.

This master output 250 is then logically combined with the secondary outputs 234–248 to generate eight different spreading sequences 252–268.

FIG. 5 is a block diagram of an exemplary one of the secondary sequence generators 202–216 shown in FIG. 2. The sequence generator 202 comprises a mask register 2021, a code channel register 2023, an XOR operator 2025, a long code generator 2027, and an AND operator 2029.

The mask register comprises three mask bits M37, M38, M39. The long code state generator generates three state bits S37, S38, S39. M37, M38, M39, and S37, S38, S39 are unique for each code channel.

In the preferred embodiment, there are eight code channels known as 0<i<7. The sequence generator 202 is associated with code channel number 0. Accordingly, the secondary sequence generator 204 is associated with the code channel number 1, the secondary sequence generator 206 with code channel number 2, the secondary sequence generator 208 with code channel number 3, the secondary sequence generator 210 with code channel number 4, the secondary sequence generator 212 with code channel number 5, the secondary sequence generator 214 with code channel number 6, and the secondary sequence generator 212 with code channel number 7.

In the binary format, each code channel is represented by code channel index comprising three bits i1, i2, and i3. The corresponding channel numbers and code channel indexes are—

| code channel number | code channel index | secondary sequence generator |
| --- | --- | --- |
| i = 0; | i1 i2 i3 = 0 0 0 | 202 |
| i = 1; | i1 i2 i3 = 0 0 1 | 204 |
| i = 2; | i1 i2 i3 = 0 1 0 | 206 |
| i = 3; | i1 i2 i3 = 0 1 1 | 208 |
| i = 4; | i1 i2 i3 = 1 0 0 | 210 |
| i = 5; | i1 i2 i3 = 1 0 1 | 212 |
| i = 6; | i1 i2 i3 = 1 1 0 | 214 |
| i = 7; | i1 i2 i3 = 1 1 1 | 216 |

The code channel register 2023 stores the code channel number and the code channel index associated with each code channel number.

The three masking bits M37, M38, and M39 from mask register 2021 are logically combined with the code channel index (i1, i2, i3) by a XOR operator 2025. In a preferred embodiment, the XOR operator 2025 has three different XOR gates such that M37 is combined with i1 through a first XOR gate, XOR1, M38 is combined with i2 through a second XOR gate, XOR2, M39 is combined with i3 through a third XOR gate, XOR3.

The XOR operator 2025 outputs three different outputs, one from each of the three XOR gates. These outputs are termed masks. The masks are then logically combined with the three states S39, S38, S37 generated by long code state generator 2027 by an AND operator 2029. In a preferred embodiment, the AND operator 2029 comprises three different AND gates, AND1, AND2, and AND3, such that S37 is fed to first AND gate AND1, S38 is fed to second AND gate AND2, S39 is fed to third AND gate AND3. The resulting output from AND operator 2029 is the secondary output 234.

There are eight different secondary sequence generators 202, 204, 206, 208, 210, 212, 214, 216 responsible for generating eight different secondary outputs 234, 236, 238, 240, 242, 244, 246, 248. The process of generating secondary outputs is the same for each secondary generator 202–216, the only difference being the code channel index (i1 i2 i3 ) used by code channel register 2023 to generate the masks. For example, for secondary sequence generator 202, the corresponding channel number is 0, so the code channel index used by code channel register 2023 to generate the mask are 0 0 0 (i1 i2 i3), while, for secondary sequence generator 204, the corresponding channel number is 1 so the code channel index number used by code channel register 2023 is 0 0 1.

In summary, the present invention discloses a spreading sequence generator 200 for generating multiple spreading sequences. The spreading sequence generator 200 accomplishes its objective by employing a master spreading sequence generator 201 and eight secondary sequence generators.

The clock rate of the proposed spreading sequence generator 200 of the present invention is the same as the chip rate, so the power consumption is very low compared to that of the sequential approach of the prior art that requires a clock rate eight times the chip rate. In the present invention, the added circuitry for generation of multiple spreading sequence is minimal, since the circuit for each code channel operates on only three bits that represent the code channel index. In contrast, the prior art, full parallel, approach involves all forty two bits for each code channel, thus significantly increasing the silicon area and power consumption.

The present invention discloses an efficient way to generate multiple spreading sequences. In the present invention, the added circuitry for generation of multiple spreading sequence is minimal, since the secondary sequence generator for each code channel operates on only three bits that represent the code channel index. In contrast, the prior art full parallel approach involves all forty two bits for each code channel, thus significantly increasing the silicon area and power consumption.

The present invention may be used in numerous CDMA and other technologies. In CDMA technology, the voice signal transmitted uses a narrow band spectrum and the data transmission relies on the use of a wide band spectrum. A pseudo-random sequence or a spreading sequence is used to widen the narrow band signal to a wide band spectrum. Thus, every time the data is transmitted, a corresponding spreading sequence must be generated. The spreading sequence generation device which can generate the above mentioned spreading sequences is necessitated respectively in each mobile and base station so that the spreading sequence generation circuit should be as small sized as possible. The present invention discloses such a spreading sequence generation device.

This present invention may be used in the chip set designed for the mobile handset for IS-95A CDMA systems. The concept also may be extended to future systems where multiple code channels are required to transmit simultaneously to achieve higher transmission rates.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method for generating multiple spreading sequences for a spread spectrum communication system, said system having multiple code channels for transmission of data, said method comprising the steps of:
   receiving multiple long codes, each long code associated with one of said multiple code channels and having a first subset of bits that are identical for each of said multiple long codes and having a second subset of bits that differ for each of said multiple long codes; and
   logically combining said first subset of long code bits with said second subset of long code bits to generate multiple spreading sequences for a spread spectrum communication system.

2. A method for generating multiple spreading sequences for a spread spectrum communication system, said system having simultaneous transmission of multiple code channels, each code channel having a code channel index number, said method comprising the steps of:
   receiving multiple long codes wherein each long code is associated with one of said code channels, and wherein each said long code comprises multiple bits and multiple states;
   selecting a first subgroup of bits and states comprising bits and states that are identical to each of said long codes;
   selecting a second subgroup of bits and states for comprising bits and states that are unique to each of said code long codes;
   logically combining said bits with said states of said first subgroup to generate a first output;
   logically combining said bits of said second subgroup with said corresponding code channel index number to generate a second output;
   logically combining said states of said second subgroup with said second output to generate a third output;
   logically combining said first and third outputs to generate a spreading sequence.

3. The method of claim 2, wherein said step of combining said first and third output is performed eight times to generate eight different spreading sequences.

4. The method of claim 2, wherein said step of combining said first and third outputs is repeated eight times in parallel to generate eight different spreading sequences.

5. The method of claim 2, wherein said step of logically combining said first and third outputs comprises modulo-2 adding said first output and said third output.

6. The method of claim 2, wherein said step of logically combining said bits and states of said first subgroup comprises ANDing said bits and said states.

7. The method of claim 2, wherein said step of logically combining said bits of said second subgroup with said code channel index number comprises XORing said bits of said second subgroup.

8. The method of claim 2, wherein said step of logically combining said states of said second subgroup with said second output comprises ANDing said states with said second output.

9. The method of claim 2, wherein said step of logically combining said first and third outputs comprises ANDing said first and third outputs.

10. A device for generating multiple spreading sequences for a spread spectrum communication system, said system providing simultaneous transmission of multiple code channels, each of said code channels having a code channel index number and having a long code comprising multiple bits and multiple states, said device comprising:
    a first sequence generator for generating a first output by logically combining the bits and states that are identical to each of said long codes;
    a second sequence generator for generating a second output by logically combining the states and bits that are unique to each of said long codes; and
    a first modulo-2 adder for logically combining said first and said second outputs to generate said spreading sequence.

11. The device of claim 10, wherein said first sequence generator further comprises a first long code state generator to generate a first state output comprising multiple states that are identical to each of said long codes, and a first mask register to generate a first mask comprising multiple bits that are identical to each of said long codes.

12. The device of claim 11, wherein said first sequence generator further comprises an first AND operator to combine said first state output and said first mask and to generate a first AND output.

13. The device of claim 12, wherein said first sequence generator further comprises a second modulo-2 adder to receive said AND output and to generate said first output.

14. The device of claim 10, wherein said second sequence generator further comprises a second long code generator to generate a second state output comprising multiple states that are unique to each of said long codes, and a second mask register to generate masking bits that are unique to each of said long codes.

15. The device of claim 14 wherein said second sequence generator further comprises a code channel register to generates said code channel index number associated with each said code channel.

16. The device of claim 15, wherein said second sequence generator further comprises an XOR operator to combine said masking bits and said code channel index number and to generate a second mask.

17. The device of claim 16, wherein said second sequence generator further comprises a second AND operator to combine said second state output and said second mask and to generate a second output.

18. The device of claim 10, wherein said first modulo-2 adder comprises a plurality of modulo-2 adders to handle the multiple combinations.

19. A device for generating eight spreading sequences for a spread spectrum communication system, said system providing simultaneous transmission of eight code channels, each of said code channels having a code channel index number and having a long code comprising forty-two bits and forty-two states, said device comprising:
    a master sequence generator for generating a master output by logically combining thirty-nine bits and thirty-nine states that are identical to each of said long codes;
    eight secondary sequence generators for generating eight secondary outputs by logically combining three states and three bits that are unique to each of said long codes; and
    eight modulo-2 adders for logically combining said master output with each of said eight secondary outputs and generating said eight spreading sequences.

20. The device of claim 19, wherein said master sequence generator further comprises a long code state generator to generate a first state output comprising said thirty-nine states that are identical to each of said long codes, and a mask register to generates a first mask comprising thirty-nine bits that are identical to each of said long codes.

21. The device of claim 20, wherein said master sequence generator further comprises a first AND operator to combine said state output and said m ask, and to generate said first AND output.

22. The device of claim 21, wherein said master sequence generator further comprises a master modulo-2 adder to receive said first AND output and to generate said master output.

23. The device of claim 19, wherein said secondary sequence generator further comprises a second long code generator to generate a second state output comprising said three states that are unique to each of said long codes, and a second mask register to generate masking bits that are unique to each of said long codes.

24. The device of claim 23, wherein said secondary sequence generator further comprises a cod e channel register to generates said code channel index number associated with each said code channel.

25. The device of claim 24, wherein said secondary sequence generator further comprises an XOR operator to combine said masking bits and said code channel index number and to generate a second mask.

26. The device of claim 25, wherein said secondary sequence generator further comprises a second AND operator to combine said second state output and said second mask and to generate a secondary output.

27. The device of claim 25 wherein said XOR operator comprises three XOR gates.

28. The device of claim 26 wherein said second AND operator comprises three AND gates.

29. A method for generating eight spreading sequences for a spread spectrum communication system, said system providing simultaneous transmission of eight code channels, each code channel having a code channel index number, said method comprising:
  (i) receiving eight long codes wherein each long code is associated with one of said code channels, and wherein each said long code comprises forty-two bits and forty-two states;
  (ii) creating a first subgroup comprising thirty-nine bits and thirty-nine states identical to each of said long codes;
  (iii) creating a second subgroup comprising three bits and three states which are unique to each of said code long codes;
  (iv) logically combining said thirty-nine bits of said first subgroup with said thirty-nine s tates of said first subgroup to generate a master output;
  (v) logically combining said three bits of said second subgroup with said co rresponding code channel index number to generate a mask;
  (vi) logically combining said three states of said second subgroup with said mask to generate a secondary output;
  (vii) repeating step(v) and step (vi) eight times to generate eight different secondary outputs;
  (viii) logically combining said master output with each of secondary outputs to generate eight different spreading sequences.

30. The method of claim 29, wherein step (vii) comprises repeating step (v) and step(vi) eight times in a sequential manner.

31. The method of claim 30, wherein step (vii) comprises repeating step (v) and step (vi) eight times in parallel.

32. An integrated circuit including a device for generating multiple spreading sequences for a spread spectrum communication system, said system providing simultaneous transmission of multiple code channels, each of said code channels having a code channel index number and having a long code comprising multiple bits and multiple states, said device comprising:
  a first sequence generator for generating a first output by logically combining the bits and states that are identical to each of said long codes;
  a second sequence generator for generating a second output by logically combining the states and bits that are unique to each of said long codes; and
  a first modulo-2 adder for logically combining said first and said second outputs to generate said spreading sequence.

33. The integrated circuit of claim 32, wherein said first sequence generator further comprises a first long code state generator to generate a first state output comprising multiple states that are identical to each of said long codes, and a first mask register to generate a first mask comprising multiple bits that are identical to each of said long codes.

34. The integrated circuit of claim 33, wherein said first sequence generator further comprises an first AND operator to combine said first state output and said first mask and to generate a first AND output.

35. The integrated circuit of claim 34, wherein said first sequence generator further comprises a second modulo-2 adder to receive said AND output and to generate said first output.

36. The integrated circuit of claim 32, wherein said second sequence generator further comprises a second long code generator to generate a second state output comprising multiple states that are unique to each of said long codes, and a second mask register to generate masking bits that are unique to each of said long codes.

37. The integrated circuit of claim 36, wherein said second sequence generator further comprises a code channel register to generates said code channel index number associated with each said code channel.

38. The integrated circuit of claim 37, wherein said second sequence generator further comprises an XOR operator to combine said masking bits and said code channel index number and to generate a second mask.

39. The integrated circuit of claim 38, wherein said second sequence generator further comprises a second AND operator to combine said second state output and said second mask and to generate a second output.

40. The integrated circuit of claim 39, wherein said first modulo-2 adder comprises a plurality of modulo-2 adders to handle the multiple combinations.

41. An integrated circuit including a device for generating eight spreading sequences for a spread spectrum communication system, said system providing simultaneous transmission of eight code channels, each of said code channels having a code channel index number and having a long code comprising forty-two bits and forty-two states, said device comprising:
  a master sequence generator for generating a master output by logically combining thirty-nine bits and thirty-nine states that are identical to each of said long codes;
  eight secondary sequence generators for generating eight secondary outputs by logically combining three states and three bits that are unique to each of said long codes; and eight modulo-2 adders for logically combining said master output with each of said eight secondary outputs and generating said eight spreading sequences.

42. The integrated circuit of claim 41, wherein said master sequence generator further comprises a long code state generator to generate a first state output comprising said thirty-nine states that are identical to each of said long codes, and a mask register to generates a first mask comprising thirty-nine bits that are identical to each of said long codes.

43. The integrated circuit of claim 42, wherein said master sequence generator further comprises a first AND operator to combine said state output and said mask, and to generate said first AND output.

44. The integrated circuit of claim 43, wherein said master sequence generator further comprises a master modulo-2 adder to receive said first AND output and to generate said master output.

45. The integrated circuit of claim 41, wherein said secondary sequence generator further comprises a second long code generator to generate a second state output comprising said three states that are unique to each of said long codes, and a second mask register to generate masking bits that are unique to each of said long codes.

46. The integrated circuit of claim 45, wherein said secondary sequence generator further comprises a code channel register to generates said code channel index number associated with each said code channel.

47. The integrated circuit of claim 46, wherein said secondary sequence generator further comprises an XOR operator to combine said masking bits and said code channel index number and to generate a second mask.

48. The integrated circuit of claim 47, wherein said secondary sequence generator further comprises a second AND operator to combine said second state output and said second mask and to generate a secondary output.

49. The integrated circuit of claim 47 wherein said XOR operator comprises three XOR gates.

50. The integrated circuit of claim 48 wherein said second AND operator comprises three AND gates.

* * * * *